United States Patent
Hall (10) Patent No.: US 10,440,941 B2
(45) Date of Patent: Oct. 15, 2019

(54) REUSABLE ROCK HOLDER FOR FISHING SINKER

(71) Applicant: Garrett Alan Hall, Viola, ID (US)

(72) Inventor: Garrett Alan Hall, Viola, ID (US)

(*) Notice: Subject to any disclaimer, the term of this patent is extended or adjusted under 35 U.S.C. 154(b) by 208 days.

(21) Appl. No.: 14/707,673

(22) Filed: May 8, 2015

(65) Prior Publication Data

US 2016/0324135 A1  Nov. 10, 2016

(51) Int. Cl.
*A01K 95/02* (2006.01)
*A01K 95/00* (2006.01)
*A01K 91/03* (2006.01)
*A01K 97/00* (2006.01)

(52) U.S. Cl.
CPC ........ *A01K 95/02* (2013.01); *A01K 91/03* (2013.01); *A01K 95/00* (2013.01); *A01K 97/00* (2013.01)

(58) Field of Classification Search
CPC ...... A01K 95/00; A01K 95/02; A01K 95/005; A01K 91/03; A01K 97/00
USPC ... 43/43.12, 44.81, 42.39, 43.14, 4.5, 44.97; 63/29.1, 23, 13
See application file for complete search history.

(56) References Cited

U.S. PATENT DOCUMENTS

| | | | | |
|---|---|---|---|---|
| 475,781 A * | 5/1892 | Lloyd | .................... | D06F 53/00 174/172 |
| 2,594,620 A * | 4/1952 | Braithwaite | ........... | A01K 95/00 43/43.1 |
| 2,651,135 A * | 9/1953 | Greenleaf | .............. | A01K 95/00 43/17.2 |
| 3,081,574 A * | 3/1963 | Wise | ...................... | A01K 95/00 43/43.12 |
| 3,180,052 A * | 4/1965 | Malesko | ................ | A01K 95/00 43/43.12 |
| 3,195,262 A * | 7/1965 | Metzler | ................... | A01K 95/00 43/43.12 |
| 3,197,912 A * | 8/1965 | Kramer | .................. | A01K 83/06 43/44.4 |
| 3,346,986 A * | 10/1967 | Tiikkainen | ............ | A01K 91/02 43/41.2 |
| 3,648,398 A | 3/1972 | Newell | | |

(Continued)

OTHER PUBLICATIONS

Danielson. (2015). "Danielson Lead Cinches Fishing Bait Rig, ¼-Inch, Amber," Amazon.com, Catalog page located at: <http://www.amazon.com/Danielson-Cinches-Fishing-4-Inch-Amber/dp/B003OARAQA>, last visited on May 20, 2015, one page.

(Continued)

*Primary Examiner* — Marc Burgess
(74) *Attorney, Agent, or Firm* — Morrison and Foerster LLP (57) ABSTRACT

A reusable rock holder for use as a fishing sinker is disclosed. According to embodiments of the disclosure, instead of using a conventional fishing sinker in a fishing rig, the reusable rock holder can secure a rock or other object for use as a sinker. The reusable rock holder can secure rocks or objects having different or irregular shapes and/or sizes corresponding to materials naturally occurring in the environment. Furthermore, the reusable rock holder can release the rock or other object when snagged, allowing the fisherman to retrieve the rock holder and the rest of the fishing rig. The fisherman can then simply find another rock, secure it in the rock holder, and resume fishing. The availability of rocks at the fishing location can provide a zero-cost source of eco-friendly sinkers.

12 Claims, 9 Drawing Sheets

(56) References Cited

U.S. PATENT DOCUMENTS

| | | | | |
|---|---|---|---|---|
| 3,744,177 | A * | 7/1973 | Cron, Jr. | A01K 95/00 43/43.12 |
| 3,982,350 | A * | 9/1976 | Heckathorn | A01K 95/005 43/43.1 |
| 4,926,580 | A * | 5/1990 | Lin | A01K 75/06 43/43.12 |
| 4,942,644 | A * | 7/1990 | Rowley | B65D 63/10 24/16 PB |
| 5,375,365 | A * | 12/1994 | Bronder | A01K 95/00 43/43.12 |
| 5,435,095 | A * | 7/1995 | Crumrine | A01K 95/00 43/44.9 |
| 5,657,645 | A * | 8/1997 | Abraham | A44C 5/0053 63/3 |
| 5,974,830 | A * | 11/1999 | Colero | A44C 3/008 29/10 |
| 6,168,539 | B1 * | 1/2001 | Maina | A63B 43/007 473/424 |
| 6,314,673 | B1 * | 11/2001 | Matteoli | A01K 91/03 43/43.12 |
| 7,794,336 | B2 * | 9/2010 | Wu | A63B 69/0086 473/424 |
| 8,261,484 | B2 * | 9/2012 | Bono | A01K 95/00 43/43.1 |
| D678,110 | S * | 3/2013 | Correa | D11/79 |
| 2003/0019147 | A1 * | 1/2003 | Glavinich | A01K 95/02 43/44.83 |
| 2004/0134119 | A1 * | 7/2004 | Glavinich | A01K 95/02 43/44.87 |
| 2006/0070291 | A1 * | 4/2006 | Pomeroy | A01K 95/005 43/44.87 |
| 2007/0234634 | A1 * | 10/2007 | Beal | A01K 95/00 43/43.1 |

OTHER PUBLICATIONS

Rockybrook Sinkers. (2014). "Fewer Snags, More Action, Loud Sound, Natural Drift!," RockyBrook, The Original Limestone Sinker, Catalog page located at: <http://www.rockybrooksinkers.com/>, last visited on May 20, 2015, one page.

* cited by examiner

REUSABLE ROCK HOLDER FOR FISHING SINKER

FIELD

This relates generally to fishing, and more particularly, to a reusable rock holder for enabling rocks to be used as fishing sinkers.

BACKGROUND

Numerous techniques are known for fishing. One of the most common techniques utilizes one or more objects, referred to collectively herein as a "rig," tied to the end of fishing line. In many instances, the rig and fishing line are coupled to a fishing rod, often accompanied by a fishing reel, for casting out and retrieving the rig. A fisherman's rig can include one or more of a hook, leader line, swivels, beads, artificial lures or flies, floats/bobbers, weights, and the like. The weight is often referred to as a "sinker" or "lead." Fishing rods, reels, lines, rigs and other fishing accessories are collectively known as fishing tackle.

Sinkers can be useful for a number of reasons. One reason for using a sinker is to present the rig at the proper depth in the water column. The type of fish sought, the feeding and/or resting habits of the fish, the time of day or year, the food sources for the fish, the habitat of the fish, and other factors may dictate the depth at which the rig should be presented. For example, when targeting fish that congregate near the bottom of bodies of water, either to rest or feed in those areas, fisherman need to get their bait or lure down to the bottom if they hope to be successful. A sinker is often helpful to pull a fisherman's rig down to the bottom. Even if the targeted fish are higher up in the water column, a sinker is helpful to keep pulling the rig down towards the bottom (without touching the bottom). The fisherman can place a rig at the proper location in the water column by stopping the sinking of the rig after a certain amount of time has elapsed, or by letting the rig hit the bottom and then lifting the rig off the bottom by giving the reel a few "cranks" (turns). In doing so, the sinker will help keep the line taut and at the right depth.

Another reason for using a sinker is to keep the rig in a fixed location. Water currents can cause a fisherman's rig to drift away from a desired location. Allowing a sinker to rest on the bottom can help ensure that the rig will not flow with the current to an undesirable location. Even when fishing off the bottom, a heavier sinker can keep the fisherman's rig more directly below the fishing site (e.g. a boat) and minimize its movement with the current to an undesirable location.

Yet another reason for using a sinker is to help with casting out the rig using a rod and reel. Because a sinker adds weight to the fisherman's rig, the rig can be cast out further.

However, a fisherman's rig can sometimes get stuck, or "snagged," on objects in the water. Often times the sinker is the item that gets snagged, because it is the heaviest item in the fisherman's rig, and is designed to rest, bounce, or drag along the bottom of the body of water being fished. Sinkers can get snagged on rocks, tree roots, stumps, underwater foliage, overhanging branches (out of the water), man-made debris, and the like. At times, the fisherman's only recourse is to break the fishing line, which means that some or all of the fishing rig (e.g., hook or lure, line, sinker, etc.) will be lost.

Losing these items is an environmental concern, because fishing line, metal hooks and swivels, plastic lures, sinkers (especially those made of lead) and other components of the rig are left behind in the water. In addition, the loss of these items can be costly to the fisherman, because these items can be expensive to replace. Furthermore, the fisherman may lose significant fishing time tying on a new rig, which can be detrimental to the fisherman's success if the fish are "biting" for only a short period of time.

Accordingly, there is a need to minimize the environmental impact, equipment replacement cost, and equipment replacement time when a sinker gets snagged on objects in the water.

SUMMARY

This relates to a reusable rock holder for use as a fishing sinker. According to embodiments of the disclosure, instead of using a conventional fishing sinker in a fishing rig, the reusable rock holder can secure a rock or other object for use as a sinker. The reusable rock holder can secure rocks or objects having different or irregular shapes and/or sizes corresponding to materials naturally occurring in the environment. Furthermore, the reusable rock holder can release the rock or other object when snagged, allowing the fisherman to retrieve the rock holder and the rest of the fishing rig. The fisherman can then simply find another rock, secure it in the rock holder, and resume fishing. The availability of rocks at the fishing location can provide a zero-cost source of eco-friendly sinkers.

BRIEF DESCRIPTION OF THE DRAWINGS

FIGS. 1A-1 to 1E illustrate example reusable rock holders employing a malleable material hook-and-loop release mechanism according to some embodiments of the disclosure.

DETAILED DESCRIPTION

In the following description, reference is made to the accompanying drawings which form a part hereof, and in which it is shown by way of illustration specific embodiments which can be practiced. It is to be understood that other embodiments can be used and structural changes can be made without departing from the scope of the embodiments of this disclosure.

This relates to a reusable rock or object holder for use as a fishing sinker. According to embodiments of the disclosure, instead of using a conventional fishing sinker in a fishing rig, the reusable object holder can secure a rock or other object for use as a sinker. The reusable rock holder can secure rocks or objects having different or irregular shapes and/or sizes corresponding to materials naturally occurring in the environment. Furthermore, the reusable rock holder can release the rock or other object when the rock or object has become snagged (and therefore immobilized), allowing the fisherman to retrieve the rock holder and the rest of the fishing rig. The fisherman can then simply find another rock, secure it in the rock holder, and resume fishing. The availability of rocks at the fishing location can provide a zero-cost source of eco-friendly sinkers.

Figure 1A:
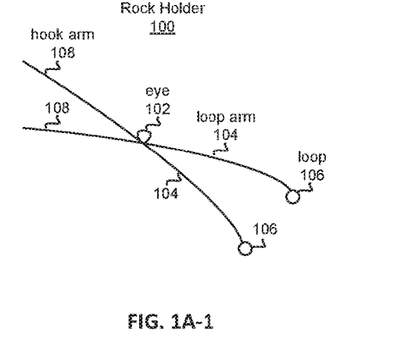

FIG. 1A-1 illustrates an example reusable rock holder 100 employing a malleable material hook-and-loop release mechanism according to some embodiments of the disclosure. In the example of FIG. 1A-1, rock holder 100 can include an eye 102 for attaching the rock holder 100 to fishing line or other parts of a fishing rig. For example, fishing line can be tied directly to the eye 102 with a knot, or fishing line can be threaded through the eye if the rock holder is employed as a sliding sinker. Alternatively, eye 102 can be connected to other parts of the fishing rig. The eye 102 can be connected to, or be integral with, one or more loop arms (loop mechanisms) 104, each of which can terminate in a loop 106 at the distal end of the loop arm, and one or more hook arms (hook mechanisms) 108. In some examples, a single strip of material, such as wire, can be used to form a single loop arm 104 and hook arm 108 pair (i.e., the loop arm 104 is formed at one end of the strip, and the hook arm 108 is formed at the other end), such that only two separate lengths of material, oriented cross-wise, may be needed to form both hook arms and loop arms. In some examples, both strips of material can be twisted together at their intersection to form the rock holder 100, and in further examples, the material can also be twisted together to form an integral eye 102.

FIG. 1A-2 illustrates another example reusable rock holder 100 employing a malleable material hook-and-loop release mechanism according to some embodiments of the disclosure. In the example of FIG. 1A-2, an eye is not formed from the strips of material that make up the loop arms 104 and hook arms 108. Instead, a separate swivel 103 or ring can be used. In some examples, the swivel can be a #10 barrel swivel, although other types and sizes of swivels can also be used. In some examples, the strips of material that make up the loop arms 104 and hook arms 108 can be threaded through and twisted onto an eye of the swivel, either mechanically or by hand. In other examples, the material can be welded to the swivel. The eye at the other end of the swivel can then be used for attaching the rock holder 100 to fishing line or other parts of a fishing rig.

In some example embodiments of FIGS. 1A-1 and 1A-2, the hook arms 108 can be about 4 inches long, and the loop arms 104 can be about 1 inch long with a size #10 loop at the end, although it should be understood that these lengths can vary depending on the size of the rock to be secured, and the loop size can also vary. The length of the arms can enable the rock holder to secure rocks or objects having different or irregular shapes and/or sizes corresponding to materials naturally occurring in the environment. The loop arms 104 and hook arms 108 can be made from one or more malleable materials, such as metal wire or strips, that can nondestructively bend or straighten in the presence of pulling force. In some examples, the loop arms 104 and hook arms 108 can be made from 24 gauge stainless steel wire, although other types of metals can also be used. In addition, although FIGS. 1A-1 and 1A-2 show two hook arms 108 and two loop arms 104, in other examples, different numbers of hook arms and loop arms may be employed. For example, the rock holder 100 may include three hook arms 108 and three loop arms 104, or two hook arms and one loop arm (both hook arms would be threaded through the same loop arm in this example). Other combinations are also possible. However, it should be noted that in most of the embodiments disclosed herein, it can be beneficial to limit the number of arms or straps used to secure a rock to ensure that the rock is adequately exposed. Having a significant portion of the rock exposed can allow the rock to make direct contact with the object at which the rock is snagged. This direct contact can allow the rock to remain substantially in place while the force applied to the rock holder and release mechanism by a fisherman allows the release mechanism to activate. Once activated, the rock holder can then slip around the substantially stationary rock and the object at which the snag is located, thereby freeing itself from the snag.

Figure 1A:
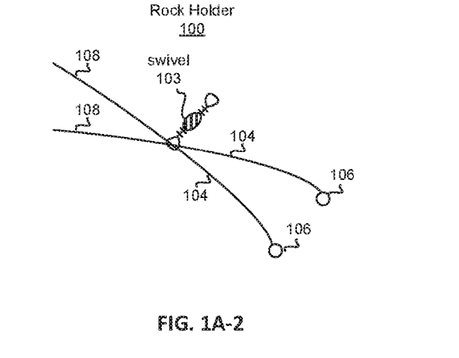
Figure 1B:
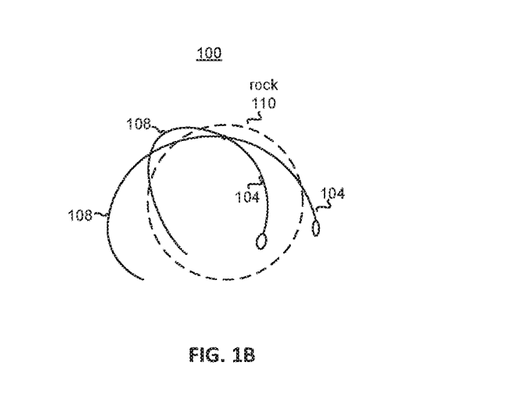

FIG. 1B illustrates the example reusable rock holder 100 of FIGS. 1A-1 or 1A-2 as it is being wrapped around a rock 110 according to some embodiments of the disclosure. In the example of FIG. 1B, the hook arms 108 and loop arms 104 begin to bend as they are shaped around rock 110.

Figure 1C:
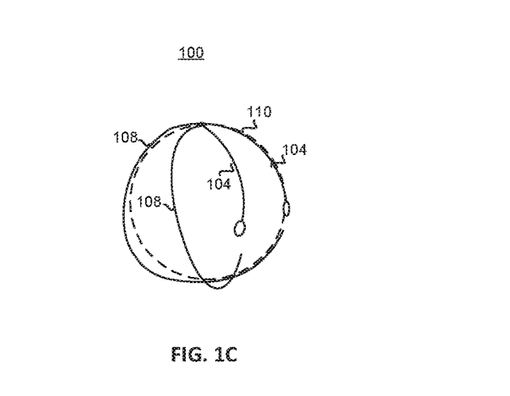

FIG. 1C illustrates the example reusable rock holder 100 of FIG. 1B as it continues to be wrapped around rock 110 according to some embodiments of the disclosure. In the example of FIG. 1C, the hook arms 108 and loop arms 104 have crossed over each other at 112 as they continue to be shaped around rock 110.

Figure 1D:
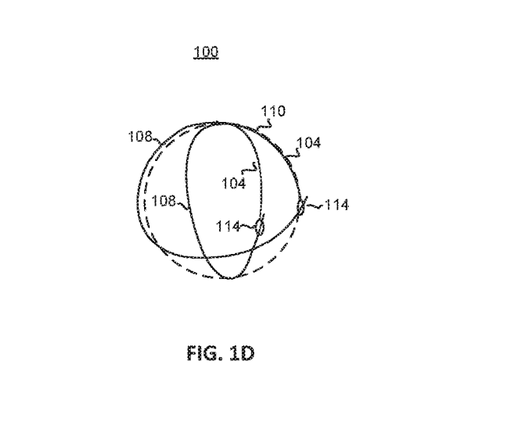

FIG. 1D illustrates the example reusable rock holder 100 of FIG. 1C as it is secured around rock 110 according to some embodiments of the disclosure. In the example of FIG. 1D, the hook arms 108 have been threaded through loop arms 104 at 114 after being wrapped around rock 110 as tightly as possible.

Figure 1E:
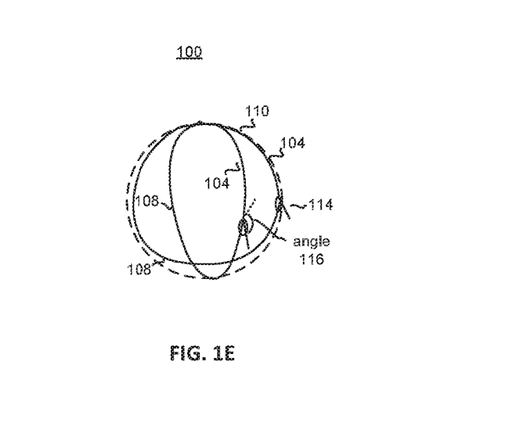

FIG. 1E illustrates the example reusable rock holder 100 of FIG. 1D as it is secured around rock 110 according to some embodiments of the disclosure. In the example of FIG. 1E, after the hook arms 108 are threaded through loop arms 104, the hook arms can be bent back at an angle 116, forming a "hook" shape. The angle 116 at which the hook arms 108 are bent can depend on the stiffness or malleability of the hook arms. For example, stiffer hook arms 108 may require less of an angle 116 to secure the rock 110 without releasing it, while softer, more pliable hook arms may require more of an angle. With the rock 110 secured as shown in FIG. 1E, the fisherman can fish as though the rock was a conventional sinker.

Figure 2A:
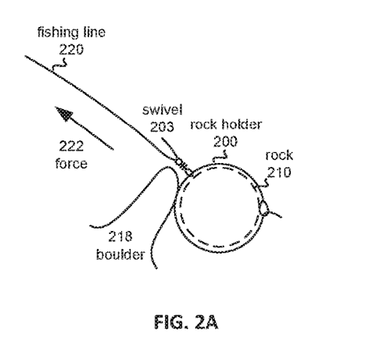
FIGS. 2A to 2E illustrate the example reusable rock holder of FIG. 1A-2 under snagged conditions according to some embodiments of the disclosure.

FIG. 2A illustrates the example reusable rock holder 200 of FIG. 1A-2 under snagged conditions according to some embodiments of the disclosure. In the example of FIG. 2A, rock holder 200 and rock 210 have become stuck ("snagged") behind underwater boulder 218. (Note that although a boulder may be described herein as the object at which the rock holder becomes snagged, it should be understood that the term "boulder" is merely representative of any number of objects at which the rock holder may become snagged.) Fishing line 220, tied to swivel 203, has been stretched taut as the fisherman has pulled in the direction indicated at 222, trying to free the reusable rock holder.

Figure 2B:
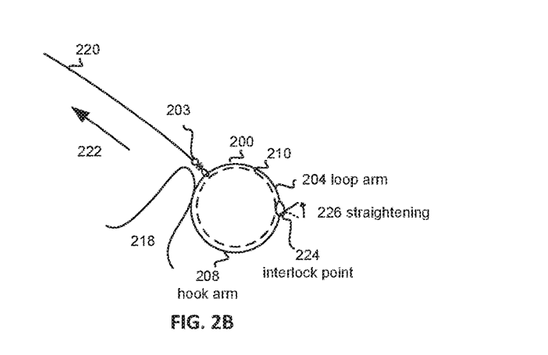

FIG. 2B illustrates the example reusable rock holder 200 of FIG. 2A under snagged conditions according to some embodiments of the disclosure. In the example of FIG. 2B, as the fisherman pulls the fishing line 220 in the direction 222, force is applied to the swivel 203 and also the connected loop arms 204 and hook arms 208. Where the loop arms 204 and hook arms 208 are interlocked at 224, the force tends to pull on the loop arms and hook arms in opposite directions. As the loop arms 204 and hook arms 208 begin to pull away from the rock 210 at the location of eye 202 due to the applied force, the hooks formed by the hook arms begin to straighten, as shown at 226.

Figure 2C:
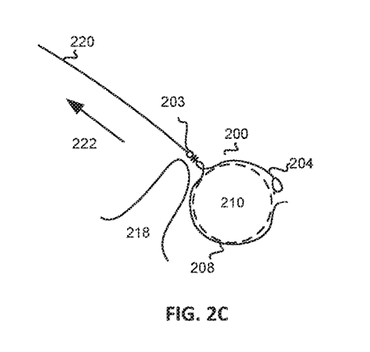

FIG. 2C illustrates the example reusable rock holder 200 of FIG. 2B as the loop arms 204 and hook arms 208 continue to straighten due to the force 222 applied by the fisherman according to some embodiments of the disclosure. In the example of FIG. 2C, the force 222 has caused the hook arms 208 to straighten to the point where the hook arms have separated from the loop arms 204.

Figure 2D:
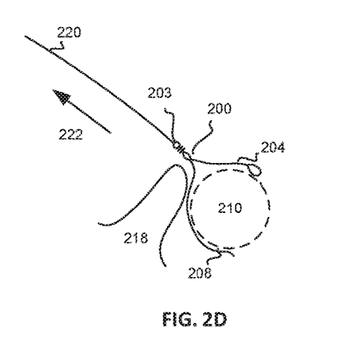

FIG. 2D illustrates the example reusable rock holder 200 of FIG. 2C as it continues to pull away from the rock 210 due to the force 222 applied by the fisherman according to some embodiments of the disclosure. In the example of FIG. 2D, the force 222 has caused the hook arms 208 and loop arms 204 to continue to straighten and slide off the rock 210.

Figure 2E:
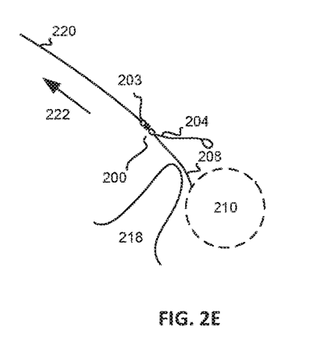

FIG. 2E illustrates the example reusable rock holder 200 of FIG. 2D as it continues to pull away from the rock 210 due to the force 222 applied by the fisherman according to some embodiments of the disclosure. In the example of FIG. 2E, the force 222 has caused the hook arms 208 and loop arms 204 to completely pull away from the rock 210. At this stage, the fisherman is able to retrieve the entire fishing rig, minus the rock. The rock holder 200 can now be reused, and another rock can be secured. The hook arms 208 and loop arms 204 can be made of a material, such as metal wire, that is malleable enough to enable the hook arms and loop arms to be formed around a rock, bent, and subsequently straightened without fatiguing the material to the point of failure.

The examples of FIGS. 1A-1 to 1E and 2A to 2E illustrate a hook-and-loop system for temporarily securing a rock. However, other temporary securement mechanisms can be employed according to embodiments of the disclosure.

Figure 3A:
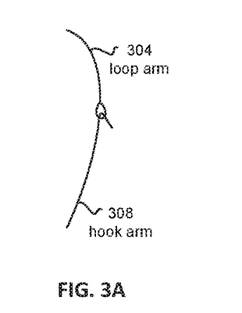
FIGS. 3A to 3E illustrate example release mechanisms for the reusable rock holder according to some embodiments of the disclosure.

FIG. 3A illustrates a closer view of the example hook arm 308 and loop arm 304 release mechanism for a reusable rock holder as shown in the preceding figures according to some embodiments of the disclosure. In the example of FIG. 3A, the hook arm 308 can be made long enough to secure rocks or objects of different or irregular shapes and/or sizes, because the hook arm can be bent wherever needed to wrap tightly around the rock. The hook arm 308 relies on the stiffness and malleability of the material (e.g., wire) to (1) enable a fisherman to form a hook shape (preferably by hand), (2) maintain its shape while confining the rock, and yet (3) straighten (to some degree) and release itself from the loop arm 304 in a non-destructive manner when the hook and loop arms are pulled in opposite directions due to force applied by the fisherman.

In some examples, the hook arm 308 and loop arm 304 can be made from one or more materials such steel, zinc, tin and the like, formed into solid wire. The type of material(s) and gauge of the wire can be selected to provide a specific release point strength. The release point strength, as defined herein, is the separation force required to cause the hook arm 308 to straighten and release from the loop arm 304. A lower release point strength means that a lower amount of opposing forces applied to the hook arm 308 and the loop arm 304 are needed to cause the hook arm to release from the loop arm. A higher release point strength means that a higher amount of opposing forces applied to the hook arm 308 and the loop arm 304 are needed to cause the hook arm to release from the loop arm. A certain minimum release point strength may be needed to keep the rock secured during use, especially during high-force moments such as overhead casting. Heavier rocks can also necessitate a higher minimum release point strength due to their weight and tendency to cause the hook arms 308 to straighten. On the other hand, a certain maximum release point strength is needed to enable the fisherman to apply sufficient opposing forces to the hook arm 308 and loop arm 304 to cause the hook arm to straighten enough to release from the hook arm, without breaking the fishing line. The desired maximum release point strength can be a function of the fishing tackle being used. For example, lighter fishing line (e.g., 6-lb test) will break under less force than heavier fishing line (e.g., 20-lb test), so the material of the hook arm 308 and loop arm 304 may need to be selected to ensure that sufficient force can be applied through the fishing line to cause the desired separation, without breaking the line.

Figure 3B:
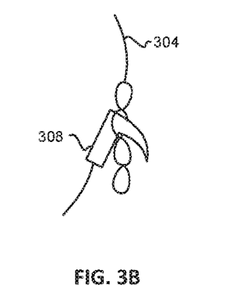

FIG. 3B illustrates another example hook arm 308 and loop arm 304 release mechanism for the reusable rock holder according to some embodiments of the disclosure. In the example of FIG. 3B, instead of being made of a malleable material such as wire, at least the end of hook arm 308 can be made of a springy and flexible material such as rubber or soft plastic, formed in the shape of a hook. When sufficient opposing forces are applied to the hook arm 308 and loop arm 304, the flexible hook arm deforms and/or bends and straightens out enough to release from the loop arm. After being released from the loop arm 304, the flexible hook arm 308 can spring back and return to its normal hook shape.

Because the hook arm 308 of FIG. 3B has a non-adjustable hook, in some examples the loop arm 304 can include multiple loops to provide adjustability. A fisherman can insert the hook arm 308 into the loop appropriate for the size of the rock being used.

Figure 3C:
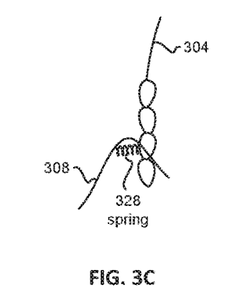

FIG. 3C illustrates a generalized example of the hook arm 308 and loop arm 304 in FIG. 3B according to some embodiments of the disclosure. In the example of FIG. 3C, the hook arm can be formed in the shape of a hook, and the springy, flexible nature of the hook arm 308 is represented symbolically by a spring 328. In some examples, the spring 328 can be implemented by an actual spring (e.g., tension, torsion springs), which can allow the hook arm 308 to be forced into an open (straight) position under sufficient separation force. In other examples, the spring 328 can take the form of elastic webbings, tendon-like bands and the like, using various types of springy or stretchy material such as rubber or soft plastics.

Figure 3D:
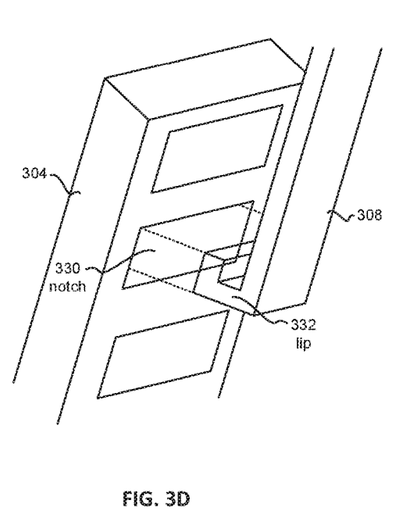

FIG. 3D illustrates a close-up view of another example hook arm 308 and loop arm 304 release mechanism for the reusable rock holder according to some embodiments of the disclosure. In the example of FIG. 3D, at least the ends of both the hook arm 308 and loop arm 304 can be made of a springy and flexible material such as rubber or soft plastic, formed in the shape of an interlocking lip 330 and notch 332, respectively. Because the hook arm 308 of FIG. 3D has a non-adjustable hook, in some examples the loop arm 304 can include multiple notches 332 to provide adjustability. The hook arm 308 and loop arm 304 can be stretched around a rock, and the lip 330 can be inserted and locked into the notch 332 appropriate for the size of the rock being secured. When sufficient opposing forces are applied to the hook arm 308 and loop arm 304, the flexible lip 330 can flex, deform and/or straighten out enough to release from the notch 332. In some examples, the notch 332 retaining the flexible lip 330 can also flex and/or deform to assist in the release. After release, the flexible lip 330 and/or notch 332 can spring back and return to their normal shapes.

Figure 3E:
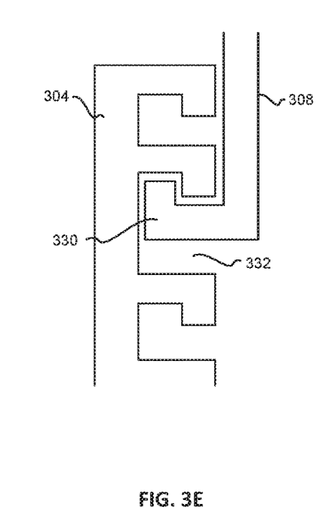

FIG. 3E illustrates a cross-sectional side view of the example hook arm 308 and loop arm 304 of FIG. 3D according to some embodiments of the disclosure.

Figure 4A:
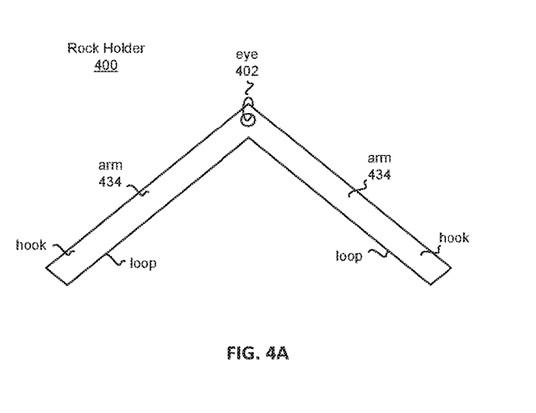
FIGS. 4A to 4C illustrate other example reusable rock holders employing a fabric hook-and-loop release mechanism according to some embodiments of the disclosure.

FIG. 4A illustrates another example reusable rock holder 400 employing a fabric hook-and-loop release mechanism according to some embodiments of the disclosure. In the example of FIG. 4A, the hook and loop arms of the previous examples are replaced by first and second arms 434 of hook-and-loop fabric with hook mechanisms on one side and loop mechanisms on the other. In the example of FIG. 4A, the first and second arms 434 can be connected to eye 402 at an angle with respect to each other, such as in an L-shape or a V-shape. In some examples, the first and second arms 434 can be formed from different strips of hook-and-loop fabric that are attached at their intersection point using one or a combination of techniques such as stitching, adhesive, grommets and the like. In other examples, a single piece of hook-and-loop fabric formed at an angle can be used. In some of these examples, a ring may be attached through the fabric or grommet at the intersection point to serve as the eye 402. In other examples, a grommet itself can serve as the eye 402.

Figure 4B:
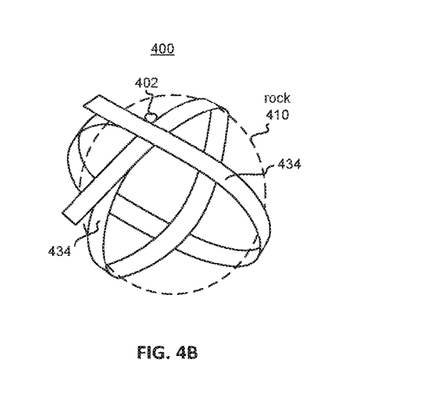

FIG. 4B illustrates the example rock holder 400 of FIG. 4A wrapped and secured around a rock 410 according to some embodiments of the disclosure. Because each of the first and second arms 434 can be wrapped around the rock 410 and secured back onto itself using the hook-and-loop connectors as long as there is some amount of overlap, a rock holder 400 with the hook-and-loop release mechanism of FIG. 4B can accommodate rocks or objects having different or irregular shapes and/or sizes. The width of the hook-and-loop straps and the size of the hooks and loops on the straps can be selected to provide particular desired release point strength. However, the amount of overlap on the straps when securing a rock can also affect the release point strength.

Figure 4C:
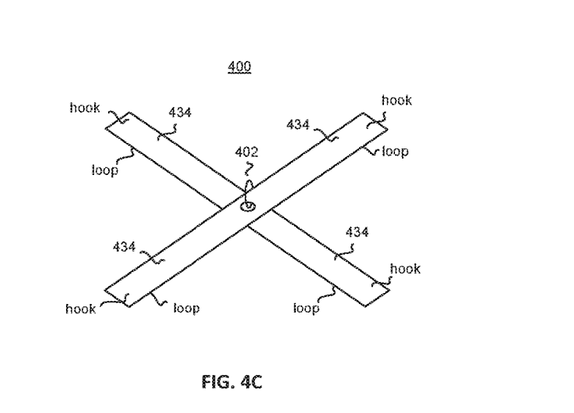

FIG. 4C illustrates another example reusable rock holder 400 using a fabric hook-and-loop release mechanism according to some embodiments of the disclosure. In the example of FIG. 4C, the first and second arms 434 are formed in an X-shape with the eye 402 at the center of the X. It should be understood, however, that other numbers and orientations of arms 434 can also be employed.

Figure 5:
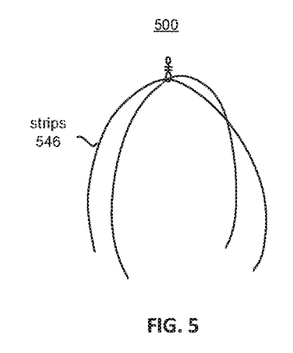
FIG. 5 illustrates another example reusable rock holder employing a malleable material release mechanism for wrapping around a rock according to some embodiments of the disclosure.

FIG. 5 illustrates another example reusable rock holder 500 employing a malleable material release mechanism for wrapping around a rock according to some embodiments of the disclosure. In the example of FIG. 5, instead of using a hook-and-loop release mechanism, a plurality of strips of material 546 (e.g., metal wire) can be employed. In general, these strips of material 546 may be longer than the hook arms and loop arms of FIGS. 1A-1 and 1A-2, for example, so that each strip of material can be wrapped around the rock as much as 360 degrees or more to secure rocks or objects having different or irregular shapes and/or sizes. In addition, the material 546 can have a sufficient stiffness to hold the rock in place without a hook-and-loop connection point. When the rock becomes snagged and a fisherman applies force to the rock holder, the strips of material 546 can straighten enough to release the rock. Although FIG. 5 illustrates four strips of material 546, it should be understood that other numbers of strips of material can also be employed.

In some examples, the reusable rock holder 500 of FIG. 5 can employ coated material such as coated wire to help the material grip the rock better. For example, coatings that are soft or rubbery can be utilized to increase their frictional adhesion to the rock.

Figure 6:
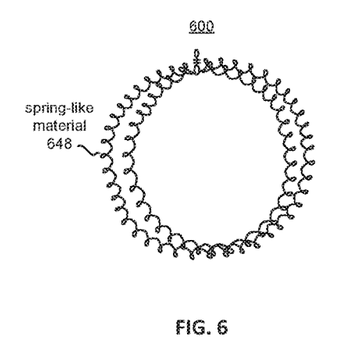
FIG. 6 illustrates another example reusable rock holder employing spring-like material as a release mechanism according to some embodiments of the disclosure.

FIG. 6 illustrates another example reusable rock holder 600 employing spring-like material as a release mechanism according to some embodiments of the disclosure. In the example of FIG. 6, instead of using a hook-and-loop release mechanism, a plurality of arms or loops of spring-like material 648 are employed. In some examples, the spring-like material 648 can be material that is formed in coils to act as springs. In other examples, the spring-like material 648 can be material having spring-like or elastic properties, such as rubber or soft plastic. Generally, the diameter of the loops 648 in their equilibrium (relaxed) state can be smaller than an approximate diameter of the size of rock expected to be used, so that the loops can stretch around the rock under tension. The ability of the loops 648 to stretch/expand can enable the rock holder to secure rocks or objects having different or irregular shapes and/or sizes. When the rock is snagged and a fisherman applies force to the rock holder, the loops 648 can slide off the rock to release the rock. Although FIG. 6 illustrates four loops of spring-like material 648, it should be understood that other numbers of loops of material can also be employed.

Figure 7A:
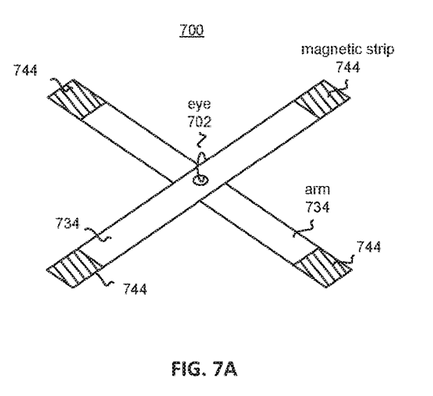
FIGS. 7A and 7B illustrate another example reusable rock holder employing a magnetic strip release mechanism according to some embodiments of the disclosure.

FIG. 7A illustrates another example reusable rock holder 700 employing a magnetic strip release mechanism according to some embodiments of the disclosure. In the example of FIG. 7A, the hook-and-loop arms of some of the previous examples are replaced by a plurality of arms 734 with magnetic strips 744 attached at their distal ends. In the example of FIG. 7A, the plurality of arms 734 can be formed in an X-shape with an eye or ring 702 at the center of the X. In some examples, the plurality of arms 734 can be formed from different strips of fabric that can be attached at their intersection point using one or a combination of techniques such as stitching, adhesive, grommets and the like. In other examples, a single piece of fabric with magnetic strips attached to the can be used. In some of these examples, a ring may be attached through the fabric or grommet at the intersection point to serve as the eye 702. In other examples, a grommet itself can serve as the eye. In the example of FIG. 7A, the plurality of arms 734 are formed in an X-shape with the eye 702 at the center of the X. It should be understood, however, that other numbers and orientations of arms 734 can also be employed.

Figure 7B:
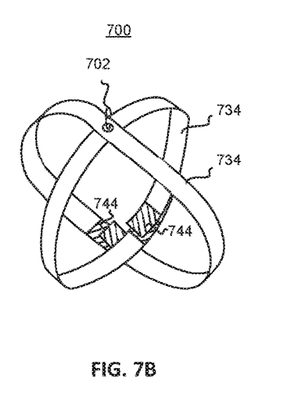

FIG. 7B illustrates the example reusable rock holder of FIG. 7A wrapped and secured around a rock according to some embodiments of the disclosure. Because each of the plurality of arms 734 can be wrapped around the rock and secured back onto itself using the magnetic strips 744 as long as there is some amount of overlap, the rock holder of FIGS. 7A and 7B can accommodate different or irregular rock or object shapes and sizes. The width of the arms 734 straps and the size of the magnetic strips 744 can be selected to provide a particular release point strength. However, the amount of overlap on the magnetic strips when securing a rock can also affect the release point strength.

When the reusable rock holder 700 of FIGS. 7A and 7B becomes snagged and a fisherman applies sufficient force to release the magnetic strips 744, as the magnetic strips separate from the rock and slide past the rock (similar to the material in FIGS. 2D and 2E separating from the rock and sliding past the rock), the attractive forces of the magnetic strips can cause the plurality of arms 734 to collapse together. This can help free the rock holder from rocks and make it more "weedless" as it is being retrieved by the fisherman.

Figure 8A:
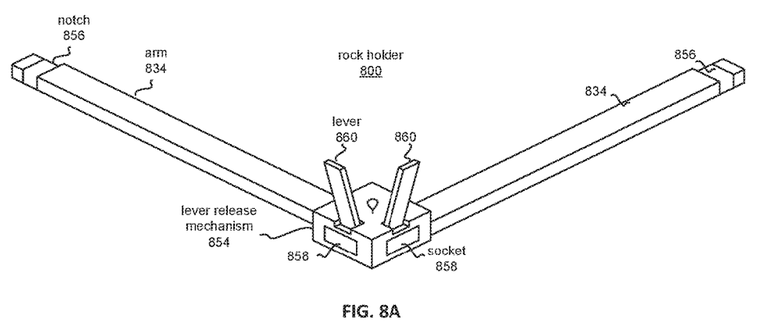
FIG. 8A illustrates another example reusable rock holder employing a lever release mechanism according to some embodiments of the disclosure.

FIG. 8A illustrates another example reusable rock holder 800 employing a lever release mechanism 854 according to some embodiments of the disclosure. In the example of FIG. 8A, a plurality of arms 834 with notches 856 at their distal ends are fixedly connected to the lever release mechanism 854. The lever release mechanism 854 includes sockets 858 opposite the arms 834. When the arms 834 are wrapped around a rock, they are inserted into the sockets 858, where they are secured in place by their notches 856 using pivoting levers 860. In some examples, the plurality of arms 834 can be formed from straps of material such as plastic. Although two arms 834 and a four-sided lever release mechanism 854 is shown in the example of FIG. 8A, it should be understood that other numbers of arms and other shapes of the lever release mechanism can also be employed. The flexibility of the arms can enable the rock holder to secure rocks or objects having different or irregular shapes corresponding to materials naturally occurring in the environment.

Figure 8B:
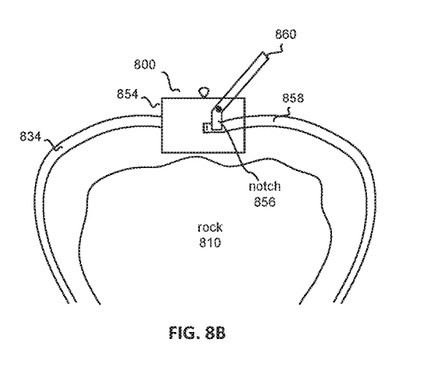
FIG. 8B illustrates a partial cross-sectional view of the example reusable rock holder of FIG. 8A with one arm wrapped and secured around a rock according to some embodiments of the disclosure.

FIG. 8B illustrates a partial cross-sectional view of the example reusable rock holder 800 of FIG. 8A with one arm 834 wrapped and secured around a rock 810 according to some embodiments of the disclosure. In the example of FIG. 8B, arm 834 has been inserted into a socket 858, and the back end of the lever 860 has dropped into the notch 856 in the arm, locking the arm into the socket.

Figure 8C:
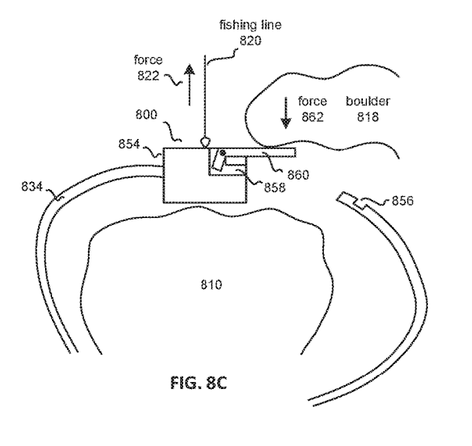
FIG. 8C illustrates a partial cross-sectional view of the example reusable rock holder of FIG. 8B releasing a rock according to some embodiments of the disclosure.

FIG. 8C illustrates a partial cross-sectional view of the example reusable rock holder 800 of FIG. 8B releasing rock 810 according to some embodiments of the disclosure. When the reusable rock holder 800 of FIGS. 8A and 8B becomes snagged on boulder 818 and a fisherman applies sufficient force 822 on fishing line 820, the boulder can apply force 862 against lever 860, causing it to pivot and have its back end pull out of notch 856. This causes the arm 834 to release from socket 858 and free the rock holder 800 from boulder 818. Note also that although FIGS. 8B and 8C only show one lever 860 and one arm 834, it should be understood that orthogonal to that lever and arm is an additional lever and arm as shown in FIG. 8A.

It should be understood that although FIGS. 8B and 8C show a back end of a lever inserted into a notch in an arm to secure the arm in the socket, it should be understood that the back end of the lever may utilize other means of securing the arm in the socket, such as the application of pressure, frictional adhesion through the use of roughened surfaces, pinching or clamping, and the like.

Figure 8D:
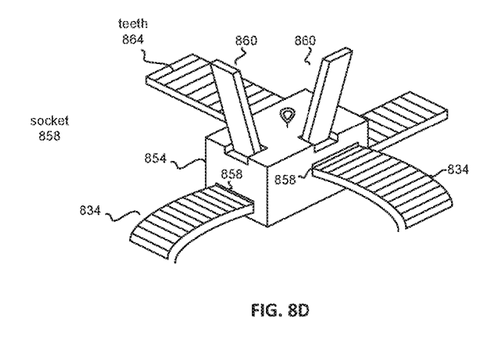
FIG. 8D illustrates another lever release mechanism according to some embodiments of the disclosure.

FIG. 8D illustrates another lever release mechanism 854 according to some embodiments of the disclosure. In the example of FIG. 8D, the arms 834 can be formed with teeth 864 along at least a portion of the distal ends of the arms. The lever release mechanism 854 can have sockets 858 that pass entirely through the lever release mechanism (at different levels) so that the arms 834 can be snugly secured against rocks or objects of different or irregular shapes and/or sizes. Levers 860 operate in a manner similar to what is shown in FIGS. 8B and 8C, except the back end of the levers is sized to drop in between two adjacent teeth in order to secure the arms 834. Although two arms 834 and a four-sided lever release mechanism 854 is shown in the example of FIG. 8D, it should be understood that other numbers of arms and other shapes of the lever release mechanism can also be employed.

Figure 9A:
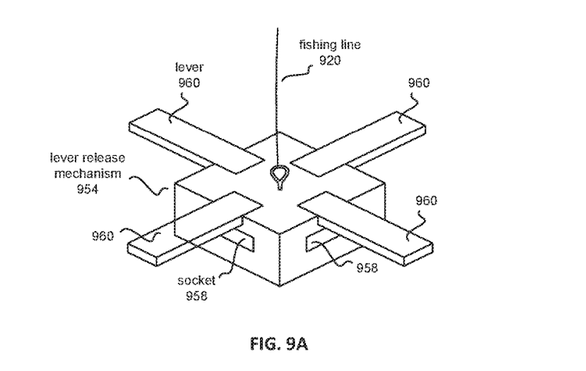
FIG. 9A illustrates another lever release mechanism according to some embodiments of the disclosure.

FIG. 9A illustrates another lever release mechanism 954 according to some embodiments of the disclosure. In the example of FIG. 9A, four levers 960 are deployed in an orientation roughly perpendicular to the expected orientation of fishing line 920. The lever release mechanism 954 includes sockets 958 underneath each of the levers 960. When arms (not shown in FIG. 9A) are wrapped around a rock, they are inserted into the sockets 958, where they are secured in place by their notches using pivoting levers 960. In some examples, the plurality of arms can be formed from straps of material such as plastic. Levers 960 operate in a manner similar to what is shown in FIGS. 8B and 8C. Although four levers 960 and a four-sided lever release mechanism 954 is shown in the example of FIG. 9A (which provide additional opportunities for contacting the object causing the snag and releasing the rock holder), it should be understood that other numbers of levers and other shapes of the lever release mechanism can also be employed.

Figure 9B:
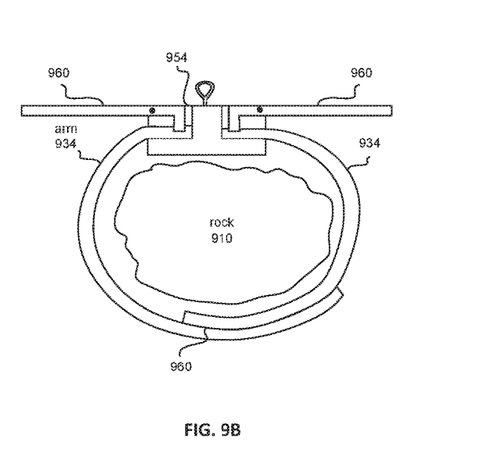
FIG. 9B illustrates a partial cross-sectional view of the example lever release mechanism of FIG. 9A with two arms wrapped and secured around a rock according to some embodiments of the disclosure.

FIG. 9B illustrates a partial cross-sectional view of the example lever release mechanism 954 of FIG. 9A with two arms 934 wrapped and secured around a rock 910 according to some embodiments of the disclosure. In the example of FIG. 9B, arms 934 have been inserted into the sockets on the lever release mechanism 954, and the back ends of the levers 960 have dropped into the notches in the arms, locking the arms into the sockets. In the example of FIG. 9B, arms 934 can be secured together at the bottom of rock 910 at 966 using hoop-and-loop technology or the like. In this manner, arms 934 can be adjusted and secured tightly against rock 910.

Figure 9C:
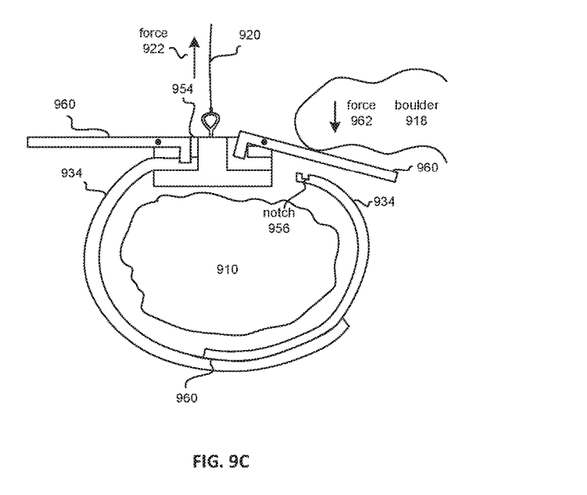
FIG. 9C illustrates a partial cross-sectional view of the example lever release mechanism of FIG. 9B releasing a rock according to some embodiments of the disclosure.

FIG. 9C illustrates a partial cross-sectional view of the example lever release mechanism 954 of FIG. 9B releasing rock 910 according to some embodiments of the disclosure. When a reusable rock holder utilizing the lever release mechanism of FIGS. 9A and 9B becomes snagged on boulder 918 and a fisherman applies sufficient force 922 on fishing line 920, the boulder can apply force 962 against lever 960, causing it to pivot and have its back end pull out of notch 956. This causes the arm 934 to release from socket 958 and free the rock holder from boulder 918. Note that although right arm 934 is no longer affixed directly to lever release mechanism 954, because it is attached to left arm 934, the right arm 934 should not be lost. Note also that although FIGS. 9B and 9C only show two levers 960 and two arms 934, it should be understood that orthogonal to those levers and arms are two additional levers and arms as shown in FIG. 9A.

Figure 10A:
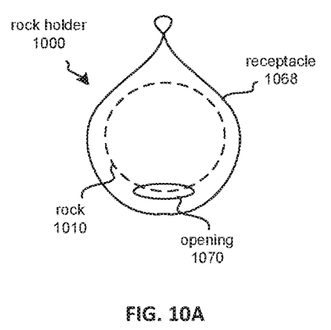
FIG. 10A illustrates another example reusable rock holder employing a receptacle according to some embodiments of the disclosure.

FIG. 10A illustrates another example reusable rock holder 1000 employing a receptacle 1068 according to some embodiments of the disclosure. In the example of FIG. 10A, receptacle 1068 can be made of a flexible and stretchy material such as rubber. The flexibility of the receptacle 1068 can enable the rock holder to secure rocks or objects having different or irregular shapes and/or sizes corresponding to materials naturally occurring in the environment. Receptacle 1068 includes an opening 1070 at the bottom, which can be temporarily stretched to receive rock 1010.

Figure 10B:
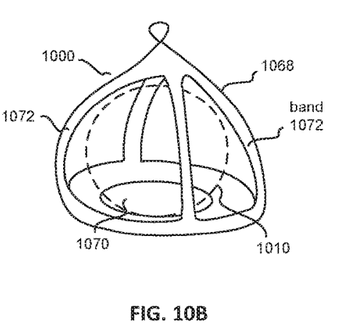
FIG. 10B illustrates another example reusable rock holder employing a receptacle according to some embodiments of the disclosure.

FIG. 10B illustrates another example reusable rock holder 1000 employing a receptacle 1068 according to some embodiments of the disclosure. In the example of FIG. 10B, receptacle 1068 can be formed of bands 1072, creating openings in the receptacle. Bands 1072 allow rock 1010 to be exposed and make direct contact with a boulder or other obstacle, which can help to free rock holder 1000.

Figure 10C:
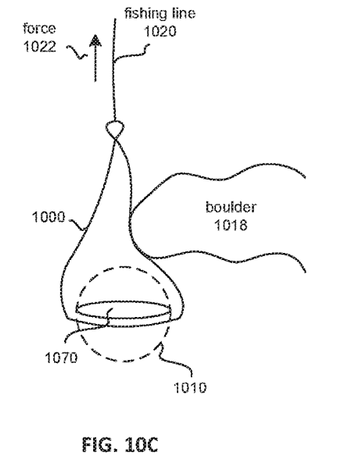
FIG. 10C illustrates the example rock holder of FIGS. 10A or 10B in the process of releasing a rock and becoming free of a boulder according to some embodiments of the disclosure.

FIG. 10C illustrates the example rock holder 1000 of FIGS. 10A or 10B in the process of releasing rock 1010 and becoming free of boulder 1018 according to some embodiments of the disclosure. In the example of FIG. 10C, when a fisherman applies force 1022 to fishing line 1020 under snagged conditions, the rock holder 1000 and its opening 1070 may begin to unevenly stretch and deform, eventually releasing rock 1010 from the holder.

Figure 10D:
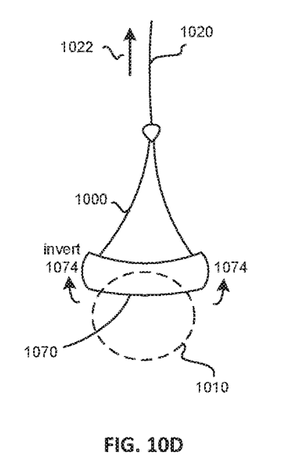
FIG. 10D illustrates the example rock holder of FIG. 10C in the advanced stages of releasing a rock according to some embodiments of the disclosure.

FIG. 10D illustrates the example rock holder 1000 of FIG. 10C in the advanced stages of releasing rock 1010 according to some embodiments of the disclosure. In the example of FIG. 10D, the rock holder 1000 can be designed such that when the opening 1070 is about at its maximum aperture and rock 1010 is just about to be released, the rock holder may actually at least partially invert (flip inside out) as shown by arrows 1074, which can aid in releasing the rock.

The examples of the reusable rock holder described above employ non-destructive release mechanisms in that upon release, the material of the rock holder and release mechanism was not destroyed, and could be reused to secure other rocks. However, in other examples of the disclosure, destructive release mechanisms can also be employed that still allow the rock holder to be reused.

Figure 11A:
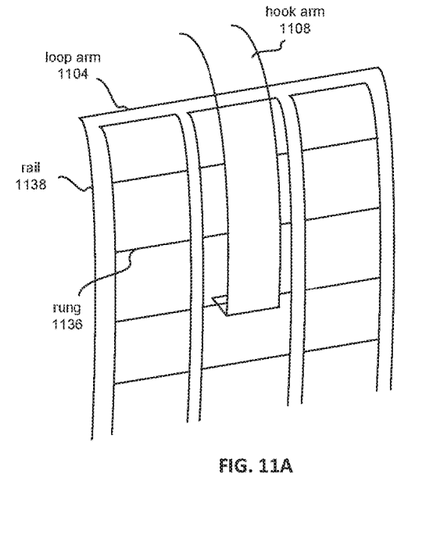
FIG. 11A illustrates an example destructive release mechanism for a reusable rock holder according to some embodiments of the disclosure.

FIG. 11A illustrates an example destructive release mechanism for a reusable rock holder according to some embodiments of the disclosure. In the example of FIG. 11A, loop arm 1104 can be formed with a ladder shape, with rails 1138 and rungs 1136. One or more "ladders" can be combined together, as shown in FIG. 11A. Hook arm 1108 can be formed in the shape of a hook. In practice, hook arm 1108 and loop arm 1104 can be stretched around a rock, and hook arm 1108 can be placed over the rung 1136 appropriate for the size of the rock. Unlike the previously described release mechanisms, the release mechanism of FIG. 11A is a destructive release mechanism, wherein rungs 1136 are designed to break when sufficient opposing forces are applied to the hook arm 1108 and loop arm 1104. Rungs 1136 can be designed to be thinner and/or made of more brittle material than the rails 1138 to break under a certain amount of force, without damaging the rails (or surrounding rungs). In some examples, rungs 1136 can be formed of the same thickness and material as other rungs, but in other examples, the rungs can have different thicknesses and/or materials to provide a variety of release point strengths. It should be understood that although three ladders are shown in FIG. 11A, any number of ladders and rungs can be used.

Figure 11B:
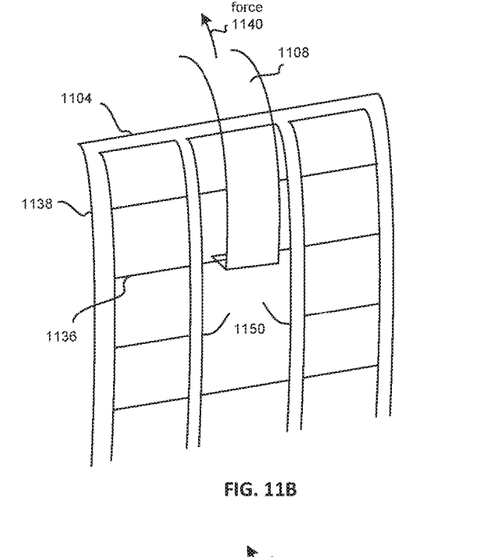
FIG. 11B illustrates the example release mechanism of FIG. 11A after a rung has snapped under pressure from a hook arm due to a force according to some embodiments of the disclosure.

FIG. 11B illustrates the example release mechanism of FIG. 11A after a rung 1136 has snapped at 1150 under pressure from hook arm 1108 due to force 1140 according to some embodiments of the disclosure. Although the broken rung can no longer be used, the rock holder can be reused because other unbroken rungs in the same "ladder" or in adjacent "ladders" can be used to secure another rock.

Figure 11C:
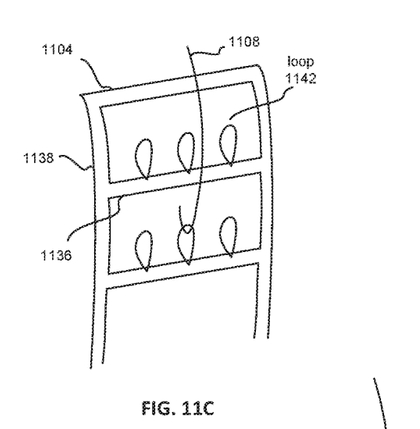
FIG. 11C illustrates another example release mechanism for a reusable rock holder according to some embodiments of the disclosure.

FIG. 11C illustrates another example release mechanism for a reusable rock holder according to some embodiments of the disclosure. In the example of FIG. 11C, loop arm 1104 can be formed in a ladder shape with rungs 1136 and rails 1138. Unlike the example of FIGS. 11A and 11B, the rungs 1136 can be designed to not break under the application of force. Instead, one or more loops 1142 can be attached to each rung. Hook arm 1108 can be formed in the shape of a hook. In practice, hook arm 1108 and loop arm 1104 can be stretched around a rock, and hook arm 1108 can be hooked to a loop 1142 on the rung 1136 appropriate for the size of the rock. The release mechanism of FIG. 11C provides a destructive release mechanism, wherein loop 1142 is designed to break when sufficient opposing forces are applied to the hook arm 1108 and loop arm 1104. Accordingly, loop 1142 can be designed of a thinner and/or more brittle material than the rungs 1136 and rails 1138 to provide a certain release point strength. In some examples, all loops 1142 on the loop arm 1104 can be formed of the same thickness and material, but in other examples, loops 1142 can have different thicknesses and/or materials to provide a variety of release point strengths.

Figure 11D:
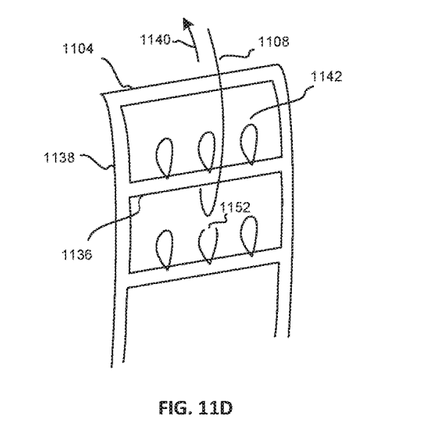
FIG. 11D illustrates the example release mechanism of FIG. 11C after a loop has snapped under pressure from a hook arm due to a force according to some embodiments of the disclosure.

FIG. 11D illustrates the example release mechanism of FIG. 11C after a loop 1142 has snapped at 1152 under pressure from hook arm 1108 due to force 1140 according to some embodiments of the disclosure. Although the broken loop can no longer be used, the rock holder can be reused because other unbroken loops in the same "ladder" can be used to secure another rock.

Figure 11E:
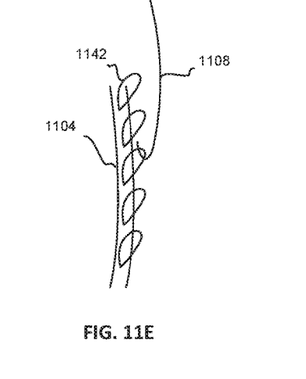
FIG. 11E illustrates a simpler release mechanism for a reusable rock holder according to some embodiments of the disclosure.

FIG. 11E illustrates a simpler release mechanism for a reusable rock holder according to some embodiments of the disclosure. In the example of FIG. 11E, loop arm 1104 can be formed as a single rail. A plurality of loops 1142 can be attached to the loop arm 1104. Hook arm 1108 can be formed in the shape of a hook. In practice, hook arm 1108 and loop arm 1104 can be stretched around a rock, and hook arm 1108 can be hooked to a loop 1142 on the loop arm 1104 appropriate for the size of the rock. The release mechanism of FIG. 11E provides a destructive release mechanism, wherein loop 1142 is designed to break when sufficient opposing forces are applied to the hook arm 1108 and loop arm 1104. Accordingly, loop 1142 can be designed of a thinner and/or more brittle material than the loop arm 1104 and hook arm 1108 to provide a certain release point strength. In some examples, all loops 1142 on the loop arm 1104 can be formed of the same thickness and material, but in other examples, loops 1142 can have different thicknesses and/or materials to provide a variety of release point strengths.

It should be understood that although the various examples described above may be described and illustrated separate from other examples, in other examples various combinations of the release mechanisms and arms described above can be employed in a single reusable object holder.

Therefore, according to the above, some examples of the disclosure are directed to a reusable object holder for use with a fishing rig, comprising: a release mechanism configured for securing an object; wherein the release mechanism is capable of securing objects of different shapes and sizes; and wherein the release mechanism is configurable for releasing the object when the object has become immobilized and a first force is applied to the release mechanism. Additionally or alternatively to one or more of the examples disclosed above, in some examples the release mechanism comprises a plurality of arms configured for wrapping at least partially around the object. Additionally or alternatively to one or more of the examples disclosed above, in some examples at least some of the plurality of arms include one of a hook mechanism and a loop mechanism. Additionally or alternatively to one or more of the examples disclosed above, in some examples at least one of the plurality of arms is capable of being temporarily bent into a hook shape. Additionally or alternatively to one or more of the examples disclosed above, in some examples at least one of the plurality of arms is formed from a flexible material formed in a hook shape. Additionally or alternatively to one or more of the examples disclosed above, in some examples at least one of the plurality of arms is formed into one or more loops. Additionally or alternatively to one or more of the examples disclosed above, in some examples at least one of the plurality of arms is formed from a flexible material into one or more notches. Additionally or alternatively to one or more of the examples disclosed above, in some examples at least some of the plurality of arms are formed from a spring-like material. Additionally or alternatively to one or more of the examples disclosed above, in some examples at least some of the plurality of arms include magnetic material. Additionally or alternatively to one or more of the examples disclosed above, in some examples the reusable object holder comprises a lever release mechanism for temporarily securing at least one of the plurality of arms, the lever release mechanism including at least one lever configured for releasing at least one of the arms when a second force is applied against the lever. Additionally or alternatively to one or more of the examples disclosed above, in some examples the lever release mechanism includes one or more sockets for receiving and securing one or more of the plurality of arms. Additionally or alternatively to one or more of the examples disclosed above, in some examples at least some of the plurality of arms include a securing mechanism for securing the arms to each other. Additionally or alternatively to one or more of the examples disclosed above, in some examples one or more of the sockets passes through the lever release mechanism to enable one or more of the plurality of arms to be tightened around the object. Additionally or alternatively to one or more of the examples disclosed above, in some examples the release mechanism comprises a receptacle having an aperture, the aperture configured for receiving the object into the receptacle. Additionally or alternatively to one or more of the examples disclosed above, in some examples the receptacle includes one or more openings for exposing the object within the receptacle. Additionally or alternatively to one or more of the examples disclosed above, in some examples at least one of the plurality of arms is formed with one or more rungs configured to break and release the object when the first force is applied. Additionally or alternatively to one or more of the examples disclosed above, in some examples at least one of the plurality of arms is formed with one or more loops configured to break and release the object when the first force is applied.

Some examples of the disclosure are directed to a method of retaining and releasing an object during fishing, comprising: securing an object within a release mechanism; and releasing the object when the object has become immobilized and a first force is applied to the release mechanism. Additionally or alternatively to one or more of the examples disclosed above, in some examples the method further comprises securing the object by wrapping a plurality of arms at least partially around the object. Additionally or alternatively to one or more of the examples disclosed above, in some examples at least some of the plurality of arms have a spring-like material. Additionally or alternatively to one or more of the examples disclosed above, in some examples the method further comprises securing at least some of the plurality of arms around the object using magnetic material. Additionally or alternatively to one or more of the examples disclosed above, in some examples the method further comprises securing at least some of the plurality of arms using a lever release mechanism, and releasing at least one of the arms when a second force is applied against a lever of the lever release mechanism. Additionally or alternatively to one or more of the examples disclosed above, in some examples the method further comprises receiving the object through an aperture in a receptacle, and securing the object within the receptacle. Additionally or alternatively to one or more of the examples disclosed above, in some examples the method further comprises securing the object using one or more rungs or loops configured to break and release the object when the first force is applied.

Some examples of the disclosure are directed to a reusable object holder for use with a fishing rig, comprising: means for securing an object within a release mechanism; and means for releasing the object when the object has become immobilized and a first force is applied to the release mechanism.

Although embodiments of this disclosure have been fully described with reference to the accompanying drawings, it is to be noted that various changes and modifications will become apparent to those skilled in the art. Such changes and modifications are to be understood as being included within the scope of embodiments of this disclosure as defined by the appended claims.

What is claimed is:

1. A reusable object holder for use with a fishing rig, comprising:
   a release mechanism configured for temporarily securing an object, the release mechanism comprising:
      a central loop configured to be disposed proximate to the object temporarily secured by the release mechanism and a plurality of independently flexible arms physically connected to the central loop, configurable around an outer surface of the object as a whole without passing through an interior of the object, wherein the plurality of independently flexible arms comprises:
  a first member that forms an arm with a first hook and another arm with a first loop at opposite ends of the first member, wherein the first hook and the first loop are configured to physically couple while the release mechanism temporarily secures the object,
  a second member that forms an arm with a second hook and another arm with a second loop at opposite ends of the second member, wherein the second hook and the second loop are configured to physically couple while the release mechanism temporarily secures the object,
  wherein each of the arms formed by the first and second members is configured to be independently flexible, and
  wherein the first and second members are formed from two different discrete pieces of malleable material;
wherein the release mechanism is capable of securing objects of different shapes and sizes; and
wherein the release mechanism is configurable for releasing the object when the object has become immobilized and a first force is applied to the release mechanism which releases the object without any arm of the plurality of independently flexible arms being physically disconnected from the central loop of the release mechanism.

2. The reusable object holder of claim 1, further comprising a swivel coupled to the central loop at one end and configured to couple to a line at an opposite end, and further configured to enable the release mechanism to rotate with respect to the line while the plurality of independently flexible arms are wrapped at least partially around the object.

3. The reusable object holder of claim 1, wherein the central loop of the release mechanism is formed by a center portion of at least one of the first and the second members and formed from the same piece of malleable material as one or more arms of the plurality of independently flexible arms.

4. The reusable object holder of claim 1, wherein the release mechanism is further configurable for releasing the object when the object has become immobilized and the first force is applied to the release mechanism, by sufficiently deforming at least one of the first and second hooks to allow at least one of the first and second hooks to release the first or second loops, respectively.

5. The reusable object holder of claim 1, wherein the two different discrete pieces of malleable material from which the first member and the second member are formed are each discrete pieces of different malleable materials such that the first member has a first malleability, and the second member has a second malleability that is different from the first malleability.

6. The reusable object holder of claim 5, wherein the release mechanism is further configurable for releasing the object when the object has become immobilized and the first force applied to the release mechanism by sufficiently deforming at least one of the first and second loops to release at least one of the first and second hooks, respectively based on the different malleability of the first and the second members.

7. A method of retaining and releasing an object during fishing, comprising:
  temporarily securing an object within a release mechanism by wrapping a plurality of independently flexible arms that are each physically connected to a central loop around an outer surface of the object as a whole without passing through an interior of the object;
  forming a first member into an arm with a first hook and another arm with a first loop at opposite ends of a first member and coupling the first hook with the first loop;
  forming a second member into an arm with a second hook and another arm with a second loop at opposite ends of a second member and coupling the second hook with the second loop, wherein each of the arms of the first and second members are independently flexible, and wherein the first and second members are formed from two different discrete pieces of malleable material;
  adjusting the release mechanism to secure the object regardless of the object's shape and size; and
  activating the release mechanism to release the object when the object has become immobilized by applying a first force to the release mechanism.

8. The method of claim 7, further comprising securing the object in a rotatable configuration by coupling one end of a swivel to the central loop of the release mechanism the swivel configured to couple to a fishing line at another end opposite the end coupled to the central loop.

9. The method of claim 8, further comprising securing the object by forming the central loop of the release mechanism from a portion of at least one of the first and second members and formed from the same piece of malleable material as one or more arms of the plurality of independently flexible arms.

10. The method of claim 9, further comprising bending at least one of the plurality of independently flexible arms into a hook shape that is based on the size of the object that is temporarily secured and a length of one or more of the first and second members.

11. The method of claim 10, further comprising utilizing a different malleable material for at least two of the plurality of independently flexible arms.

12. The method of claim 9, further comprising configuring the release mechanism to activate by deforming at least one of the first and the second loops to release one or more of the first or the second hooks, respectively.

* * * * *